A. C. WILCOX.
GLASS BLOWING APPARATUS.
APPLICATION FILED OCT. 10, 1913.
1,174,919.
Patented Mar. 7, 1916.
10 SHEETS—SHEET 1.
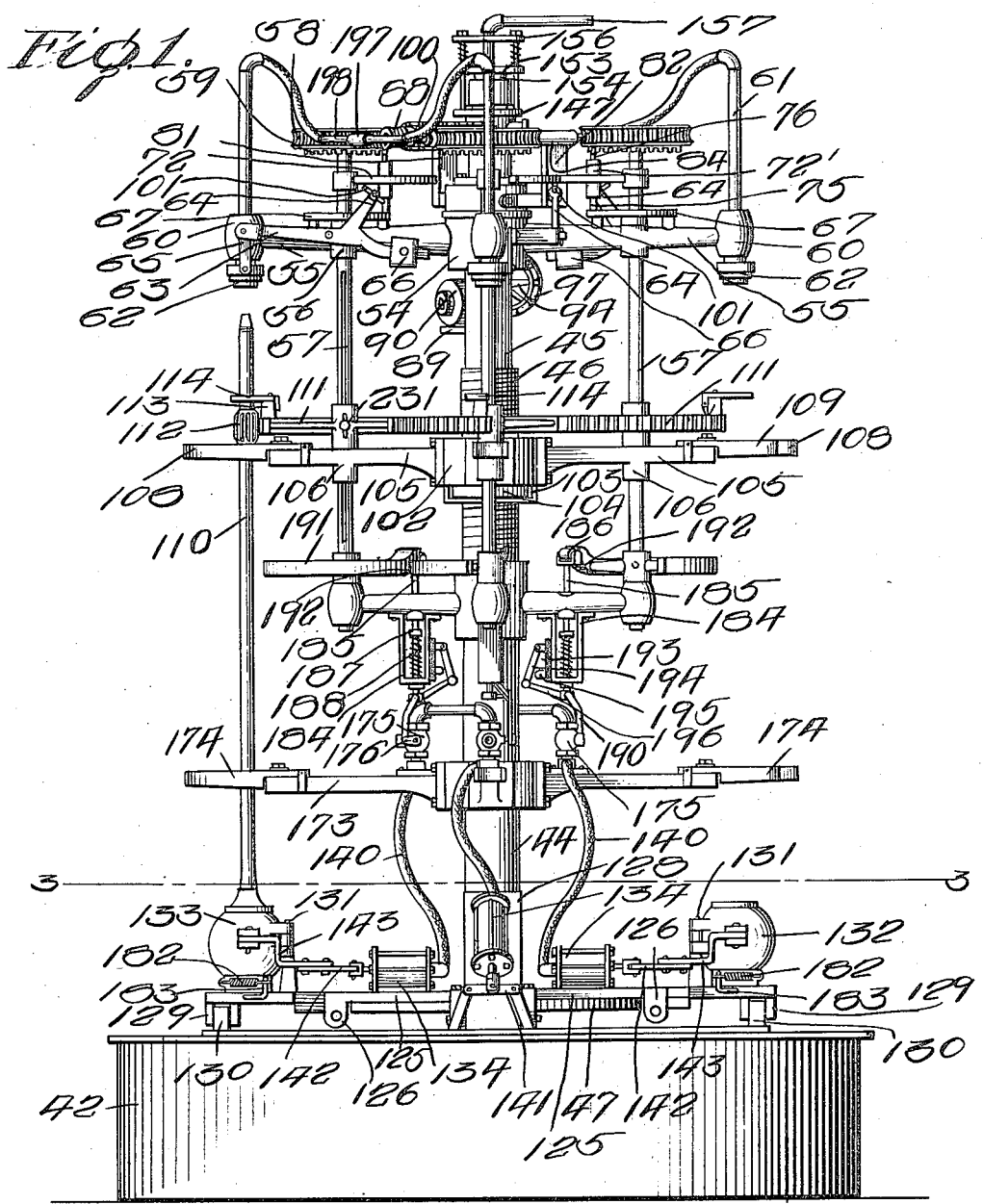
Fig. 1.
Witnesses
B.B. Brown
Henry T. Bright
Inventor
A. C. Wilcox
Attorneys A. C. WILCOX.
GLASS BLOWING APPARATUS.
APPLICATION FILED OCT. 10, 1913.
1,174,919.
Patented Mar. 7, 1916.
10 SHEETS—SHEET 2.
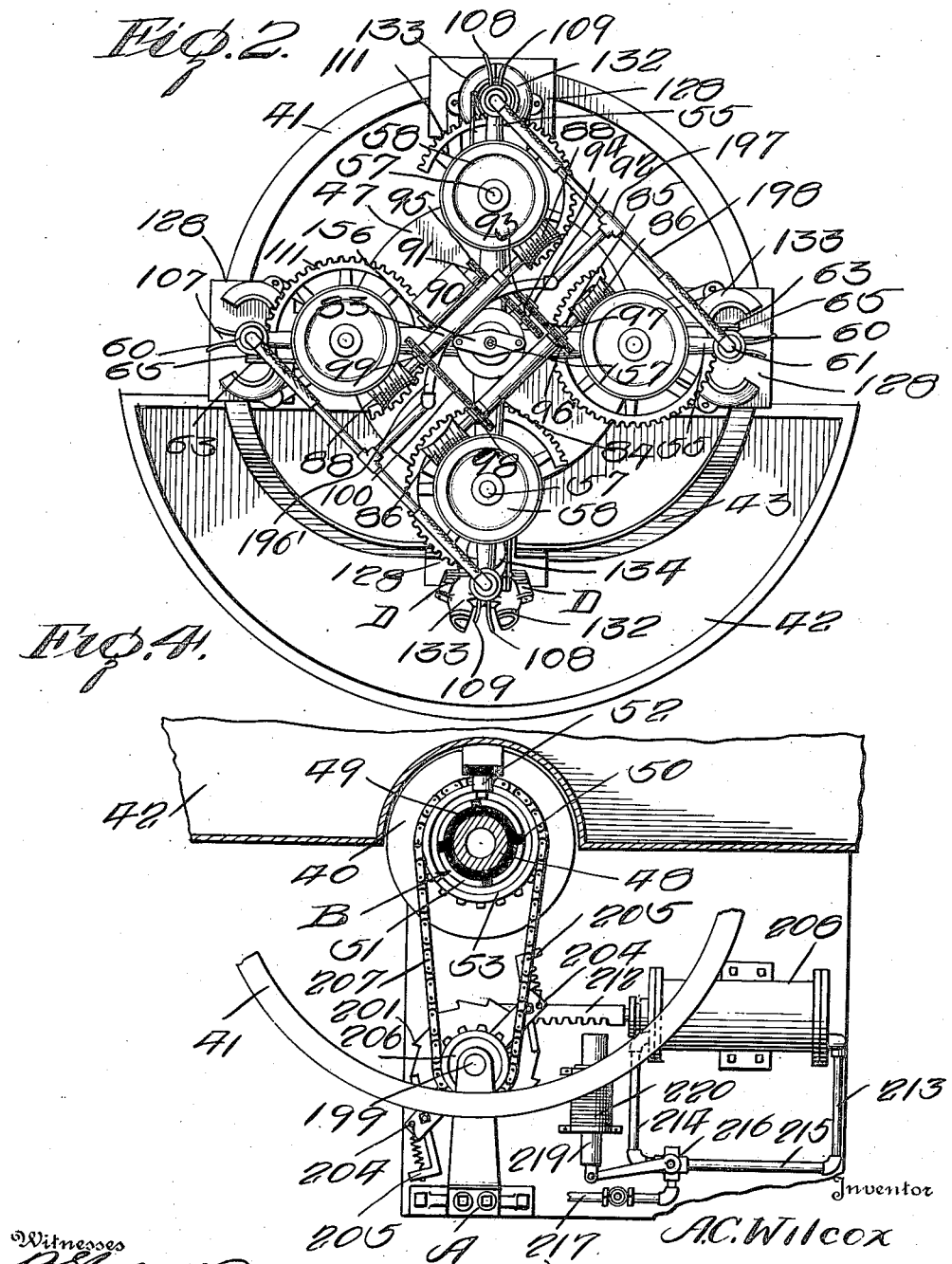

A. C. WILCOX.
GLASS BLOWING APPARATUS.
APPLICATION FILED OCT. 10, 1913.
1,174,919.
Patented Mar. 7, 1916.
10 SHEETS—SHEET 3.
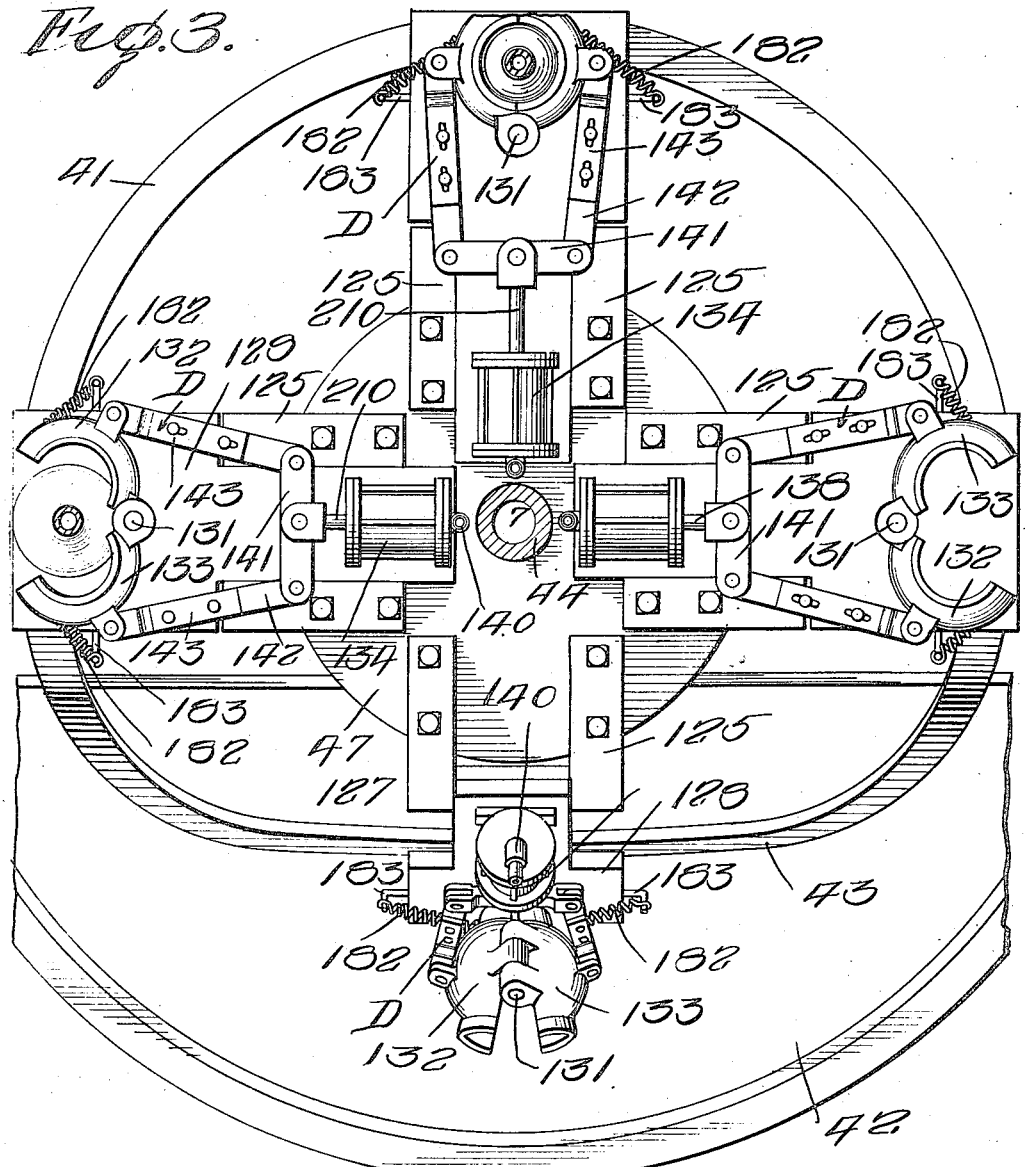
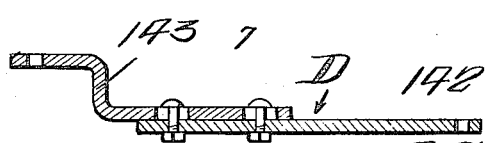

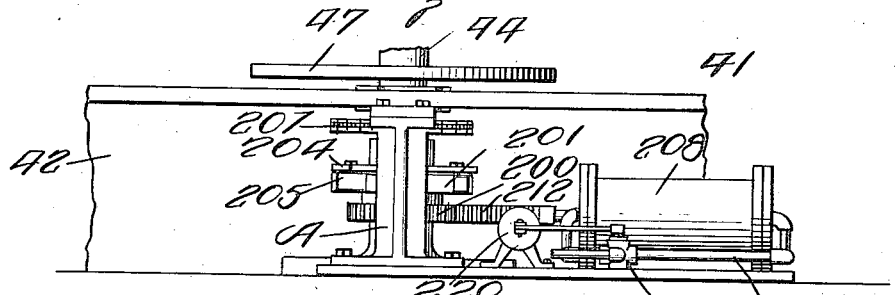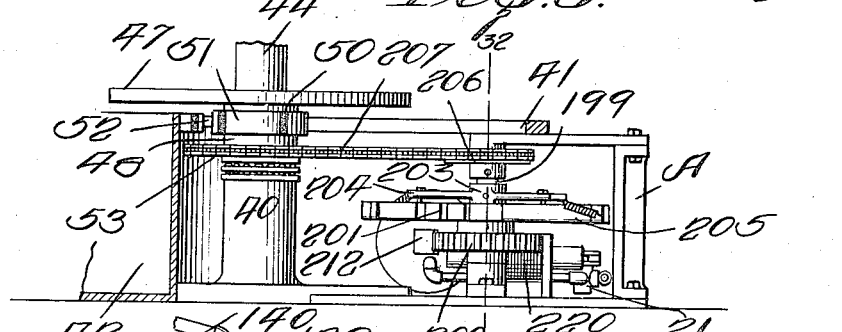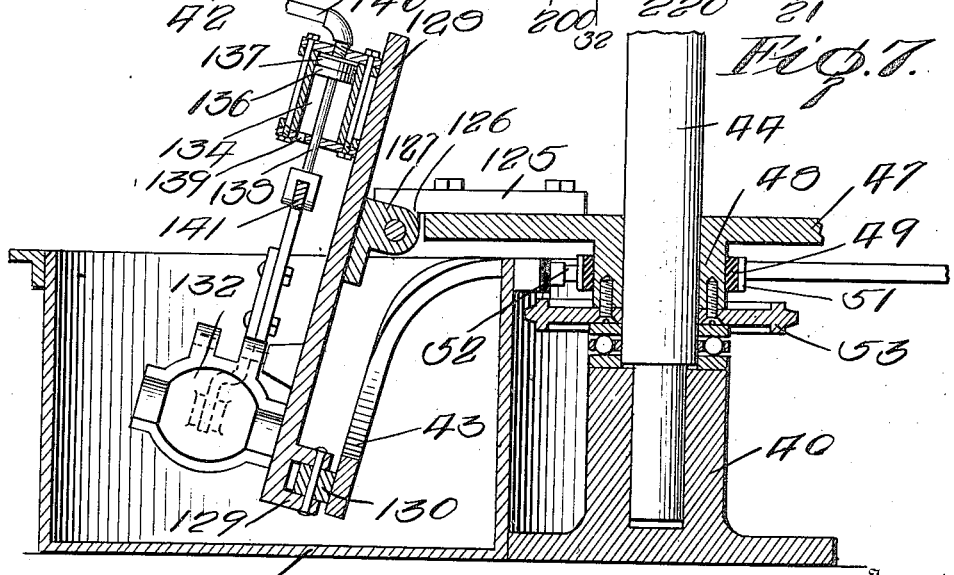

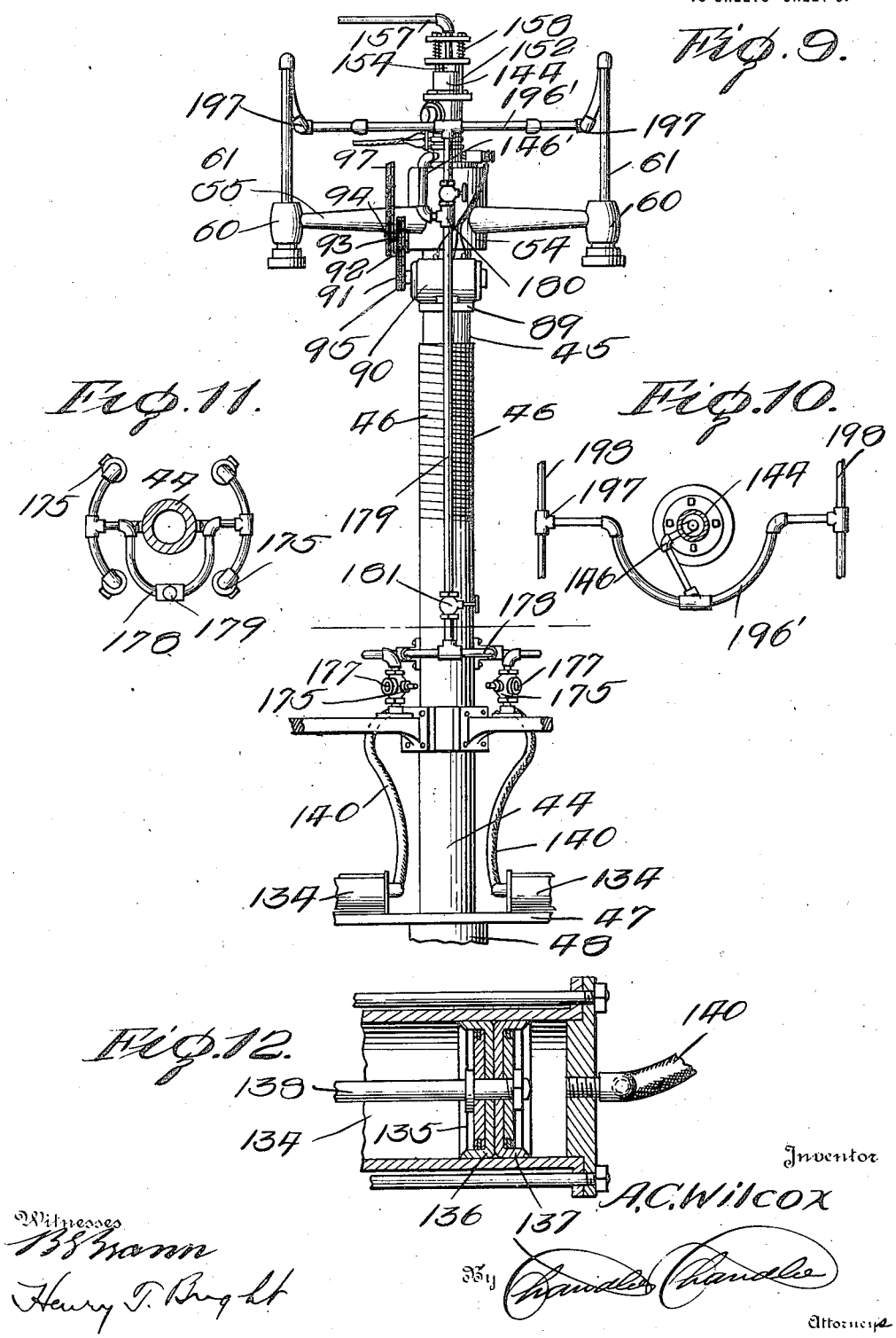

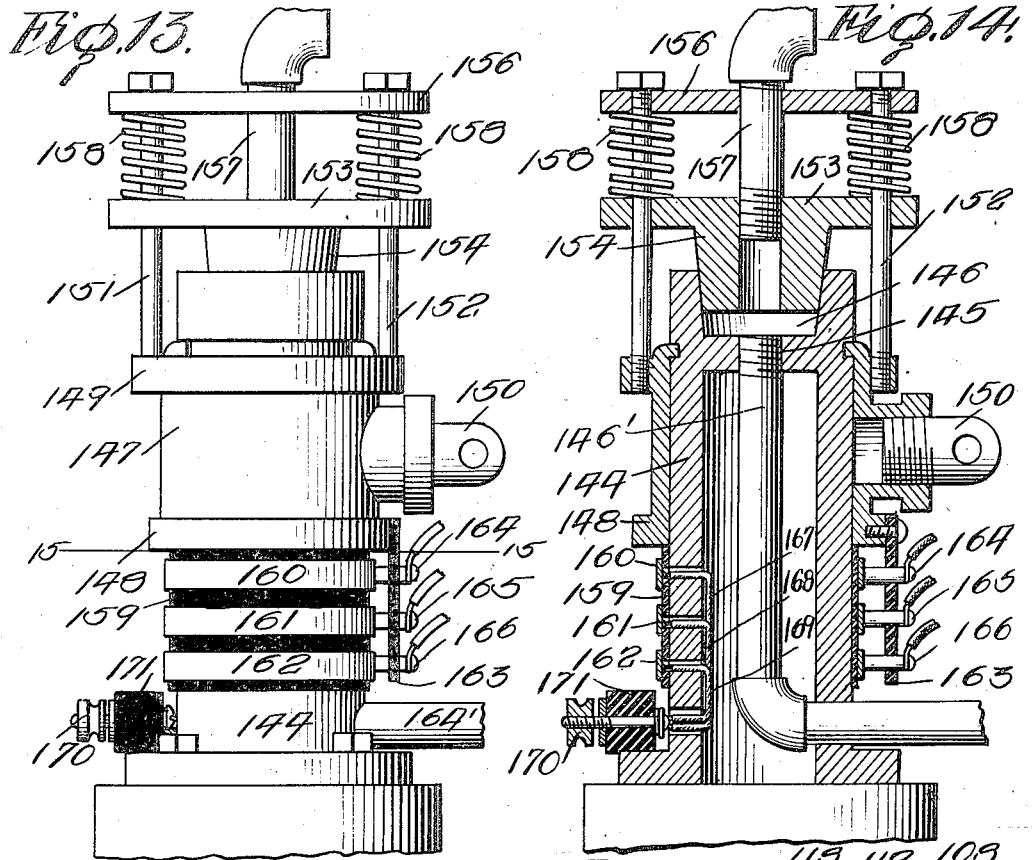

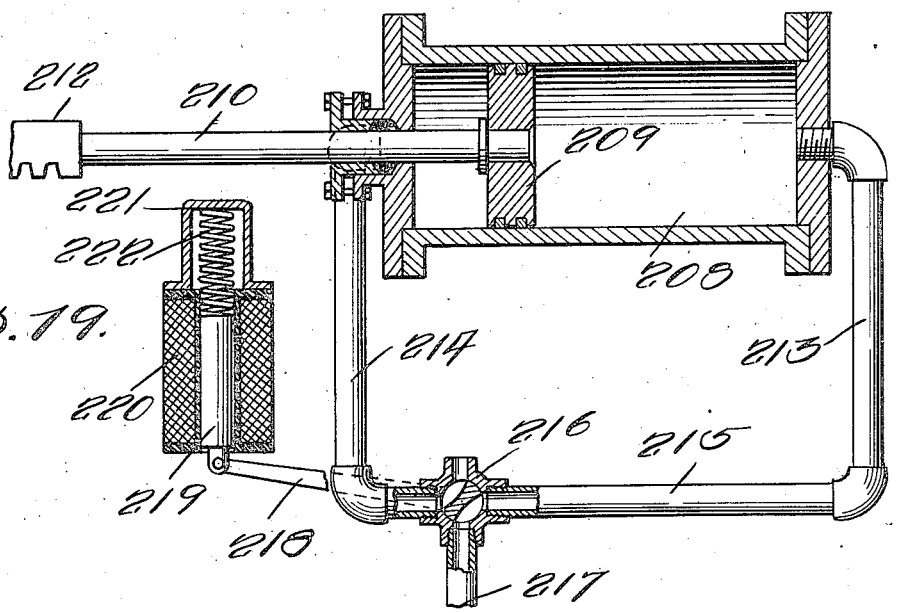
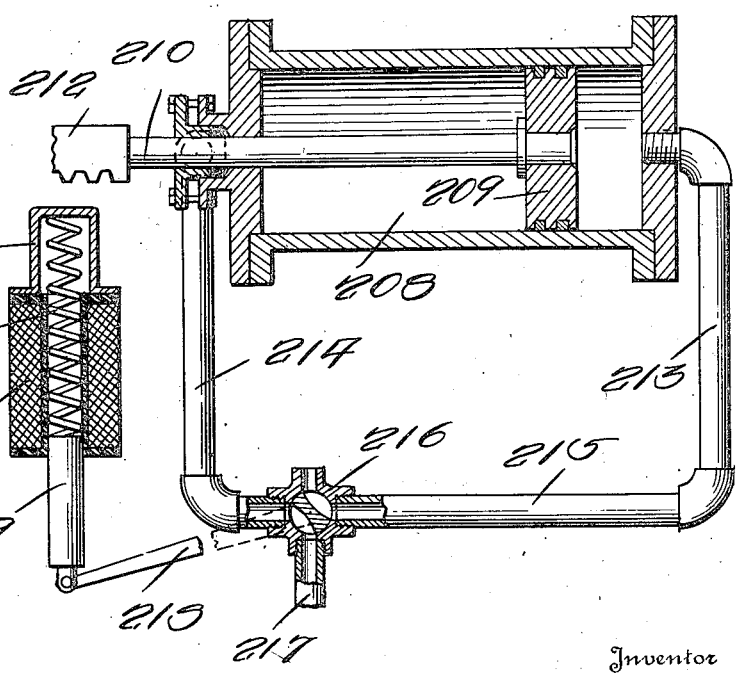

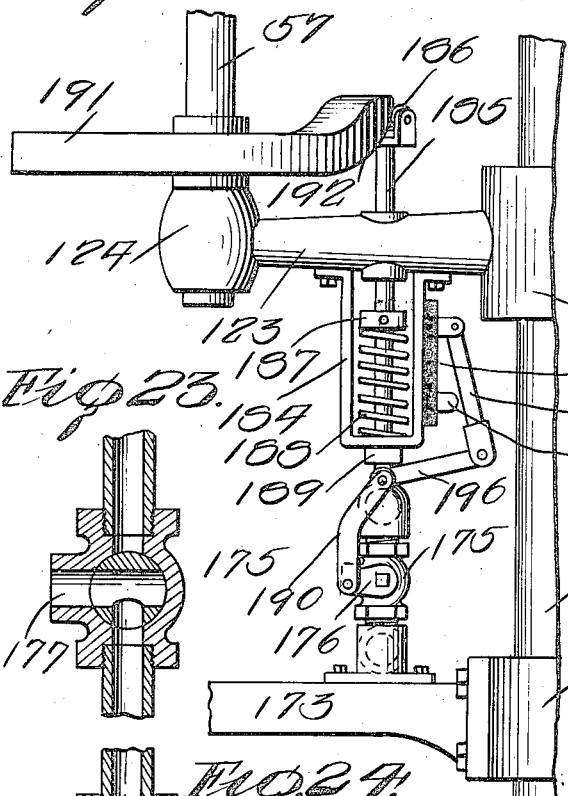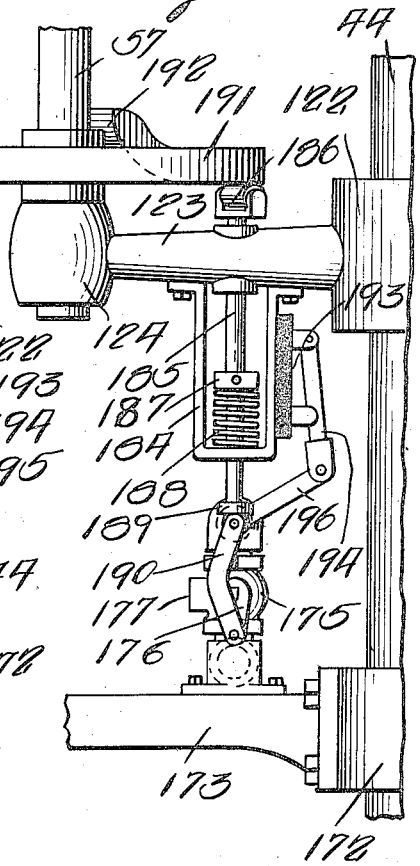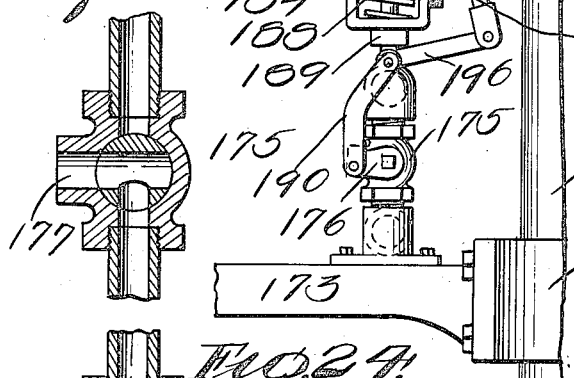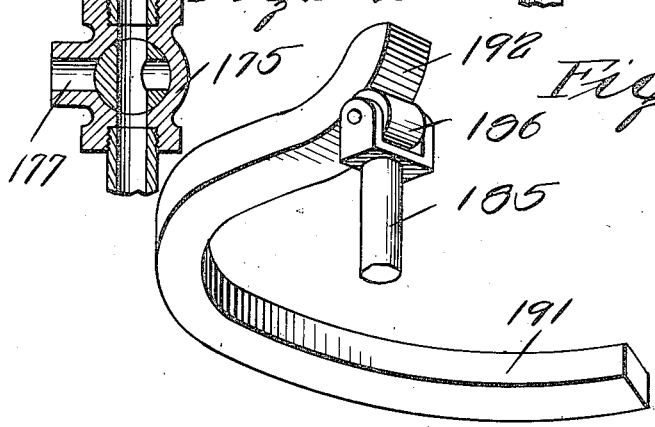

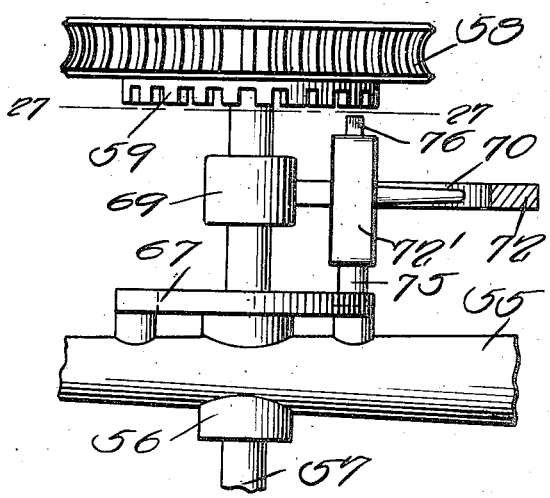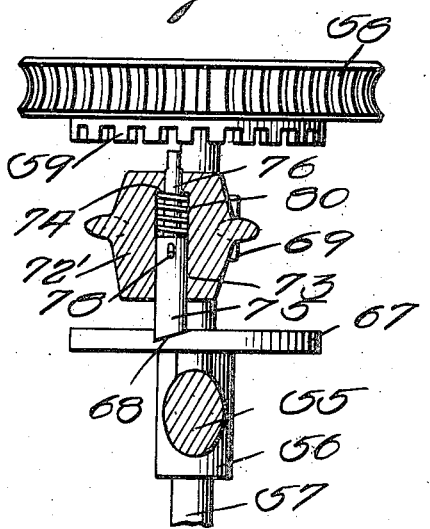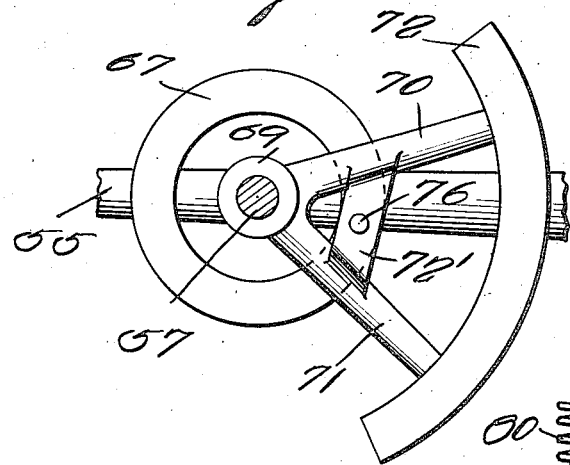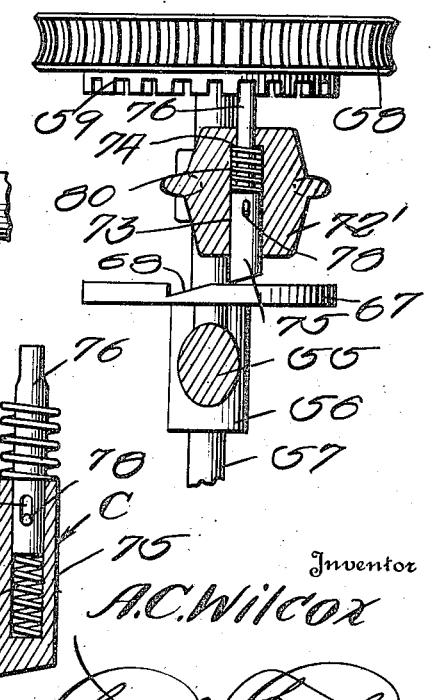

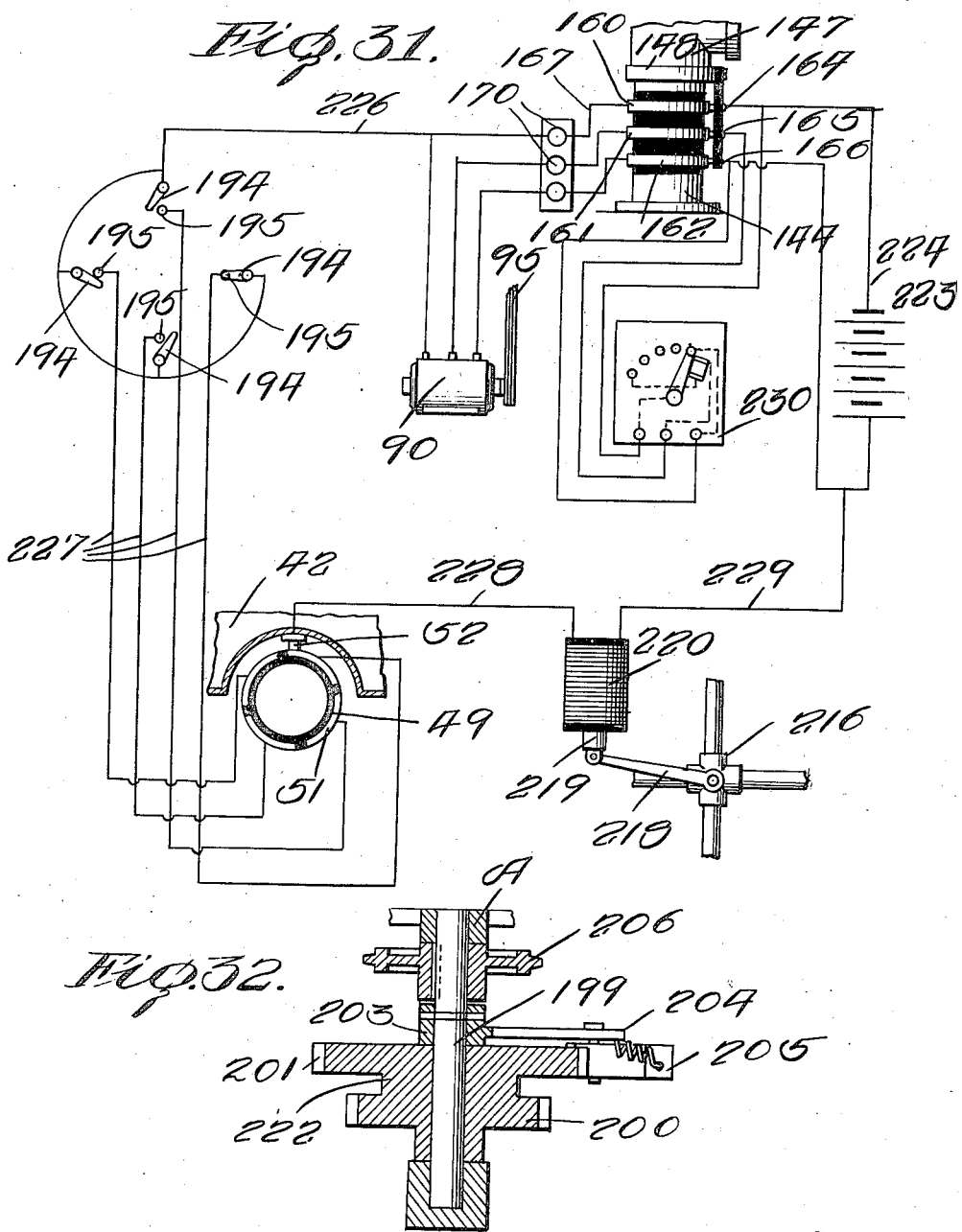

UNITED STATES PATENT OFFICE.

ALBERT C. WILCOX, OF WHEELING, WEST VIRGINIA.

GLASS-BLOWING APPARATUS.

1,174,919.   Specification of Letters Patent.   Patented Mar. 7, 1916.

Application filed October 10, 1913. Serial No. 794,458.

*To all whom it may concern:*

Be it known that I, ALBERT C. WILCOX, a citizen of the United States, residing at Wheeling, in the county of Ohio, State of West Virginia, have invented certain new and useful Improvements in Glass-Blowing Apparatus; and I do hereby declare the following to be a full, clear, and exact description of the invention, such as will enable others skilled in the art to which it appertains to make and use the same.

This invention relates to glass blowing apparatus and particularly to apparatus of this type employed in the production of what is commonly known as "paste ware".

The object of the invention resides in the provision of an apparatus of the character named which embodies a rotatable carrier and a plurality of corresponding glass blowing devices mounted upon the carrier each of which is adapted to be operated to effect one complete blowing operation through the medium of means which is set in operation by the application of a blow pipe thereto, such application of a blow pipe also serving to render active means for imparting a partial rotation to the carrier.

A further object of the invention resides in the provision of a glass blowing apparatus of the character named which embodies improved structure for effecting the cooling of the molds of the various glass blowing devices during the rotation of the carrier.

Broadly speaking the object of the invention resides in the provision of a glass blowing apparatus which will produce uniformly perfect ware, which is capable of an exceedingly large output of product, and which will require a relatively small amount of attention during its operation with resultant economy and correspondingly large profits incident to its use.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a view in elevation of a glass blowing apparatus constructed in accordance with the invention; Fig. 2, a plan view of the apparatus; Fig. 3, an enlarged section on the line 3—3 of Fig. 1; Fig. 4, an enlarged partial horizontal section through the machine showing the mechanism for rotating the carrier of the apparatus in plan; Fig. 5, a view in elevation of the carrier rotating mechanism; Fig. 6, a view in elevation looking at the left hand side of Fig. 5; Fig. 7, a section on the line 7—7 of Fig. 3; Fig. 8, an enlarged section taken longitudinally through the connection between one of the mold sections and the piston of the air operated motor which is utilized to open and close the mold of the associated glass blowing device; Fig. 9, a view in elevation of a fragment of the apparatus showing the connections between the air supply and the blowing devices and between the air supply and the air operated motors which effect the opening and closing of the molds, various parts of the apparatus being omitted in this instance for the sake of clearness; Fig. 10, a detail view showing the structure for distributing the air from the supply to the various blowing devices; Fig. 11, a detail view showing the structure for distributing air from the supply to the various mold operating motors; Fig. 12, a partial longitudinal section through one of the mold operating motors; Fig. 13, a view in elevation of the connection between the fixed and rotating portions of the air supply piping; Fig. 14, a vertical section of what is shown in Fig. 13; Fig. 15, a section on the line 15—15 of Fig. 13; Fig. 16, a plan view of the blow pipe holder element together with certain contiguous parts of the apparatus and showing said parts in the position they would occupy prior to the insertion of a blow pipe in the holder; Fig. 17, a view similar to Fig. 16 showing the position of the parts after a blow pipe has just been applied to the holder; Fig. 18, a fragmental perspective view of the blow pipe rotating gear and showing the pivoted arm carried thereby which is engaged by the blow pipe during the insertion of the latter into its holder to produce a partial rotation of the gear and thereby throw in the clutch for operating the blowing device; Fig. 19, a horizontal section through the air motor which effects the rotation of the carrier with the parts of the motor and certain contiguous parts of the apparatus in the position they would occupy just before the piston of the motor completes its carrier rotating stroke; Fig. 20, a view similar to Fig. 19 with the parts in the position they would occupy just before the piston of the motor completes its stroke which is ineffective to rotate the carrier; Fig. 21, a view in elevation of the mechanism for controlling the supply and exhaust of air to and from the associated mold operating motor and also for closing and breaking the circuit which energizes the solenoid controlling the carrier rotating means, the parts of the mechanism being shown in the position they would occupy before the institution of the operation of the glass blowing device with which it is associated; Fig. 22, a view similar to Fig. 21 with the parts in the position they would occupy during the operation of the glass blowing device with which they are associated; Fig. 23, a section through the three-way valve embodied in the mechanism for controlling the supply and exhaust of air to and from the associated mold operating motor, the status of the valve being that shown in Fig. 21; Fig. 24, a view similar to Fig. 23, the status of the valve being that shown in Fig. 22; Fig. 25, a perspective view of the valve opening and switch closing cam embodied in the mechanism illustrated in Figs. 21 and 22; Fig. 26, a view in elevation of the clutch device adapted to be automatically thrown in by the application of a blow pipe to the corresponding head of the apparatus, the parts of the device being in the position they would occupy previous to the application of the blow pipe; Fig. 27, a section on the line 27—27 of Fig. 26; Fig. 28, a view partly in section looking at the right hand side of Fig. 26; Fig. 29, a view similar to Fig. 28 with the parts in the position they would occupy just after the clutch device has been thrown in; Fig. 30, a vertical section of the locking bolt of the clutch device; Fig. 31, a diagrammatic view showing the wiring of the apparatus, and Fig. 32, a section on the line 32—32 of Fig. 6.

Referring to the drawings the apparatus is shown as comprising a base bearing 40 about which is arranged a concentrically disposed frame A including a track 41. The ends of the frame A are connected by an arcuate tank 42 which is also disposed concentric with the base bearing 40. The track 41 is extended to traverse the tank 42 and that portion of said track disposed within the limits of the tank 42 is directed downwardly as at 43, it being noted that this arrangement of the track 41 renders same continuous or endless. Rotatably supported by the bearing 40 is a column 44 the upper end of which is reduced as at 45 and just beneath the reduced portion 45 said column is threaded as at 46 for a purpose that will presently appear. Fixed on the column 44 is a circular table 47 having a downwardly extending hub 48 upon which latter is mounted a make and break device B including a ring of insulating material 49 provided with projections 50 arranged in diametrically opposite pairs. Disposed between the projections 50 are contact plates 51, the number of contact plates 51 and projections 50 corresponding to the number of heads of the apparatus, four such projections and contact plates being shown in this instance as four similar heads are embodied in the apparatus illustrated. The periphery of the make and break device B is engaged by a contact finger 52 suitably mounted on the adjacent wall of the tank 42. Fixed on the column 44 between the hub 48 and bearing 40 is a sprocket wheel 53 for a purpose that will presently appear.

Mounted upon the upper end of the column 44 is a collar 54 from which radiate four arms 55 arranged in diametrically opposite pairs with the adjacent arms disposed at right angles to each other. Each of the arms 55 is provided intermediate its ends with a bearing 56 and rotatably mounted in each of the bearings 56 is a vertical shaft 57. Loosely mounted on the upper end of each shaft 57 is a worm wheel 58 which has secured to its lower side a crown gear 59. The outer end of each arm 55 has formed integral therewith a bearing 60 and slidable in this bearing is a pipe 61 which carries on its lower end a slip joint 62 of a type fully described in U. S. Letters Patent #1,029,779 granted to me June 18, 1912. Pivoted on each arm 55 is a two-arm lever 63 which is provided intermediately with a laterally and upwardly directed arm 64. One end of the lever 63 is connected by a link 65 with the adjacent slip joint 62 while the other end thereof carries a balancing weight 66. Mounted upon each of the arms 55 is a horizontally disposed circular track 67 arranged concentrically to the adjacent shaft 57 and provided on its upper side with a notch 68 for a purpose that will presently appear. Fixed on each shaft 57 between the track 67 and the adjacent crown gear 59 is a hub 69 from which radiate spokes 70 and 71, said spokes carrying at their outer ends an arcuate track 72 disposed concentric to the adjacent shaft 57. The spokes 70 and 71 are connected by a web 72' disposed over the track 67 and provided with a vertical passage 73 the lower portion of which passage is enlarged to form a shoulder 74. Mounted in the passage 73 is a clutch locking bolt C which embodies a lower socket member 75 in which is slidably mounted a pin or bolt 76. The pin or bolt 76 is provided with a transverse passage 77 through which extends a bridge pin 78 having its terminals connected to the socket member 75. It will be noted that the passage 77 is considerably wider than the diameter of the bridge pin 78 so that the pin or bolt 76 is capable of limited movement in the socket member 75 as will be obvious. A spring 79 is interposed between the inner end of the pin 76 and the base of the socket of the member 75, said spring serving to normally hold the pin 78 against the inner side of the passage 77 whereby the pin or bolt 76 will normally be capable of a limited movement inwardly of the socket member 75. Encircling the pin or bolt 76 is a spring 80 of greater strength than the spring 79. This spring 80 bears at one end against the socket member 75 and at its other end against the shoulder 74 and serves to yieldingly hold the lower end of the socket member 75 into engagement with the track 67.

The structure by which the worm wheels 58 of the various heads of the apparatus are simultaneously and continuously rotated embodies brackets 81 and 82 which carry respectively horizontal bearings 83 and 84, said bearings being disposed in parallel relation. Rotatably mounted in the bearing 83 is a shaft 85 which has fixed on respective ends thereof worms 86 meshing with adjacent worm wheels 58 respectively. Rotatably mounted in the bearing 84 is a shaft 87 which has fixed on the terminals thereof respectively worms 88 meshing with adjacent worm wheels 58. Mounted upon the reduced portion 45 of the column 44 is a bracket 89 and supported by this bracket is an electric motor 90. Fixed on the shaft of the motor 90 is a sprocket wheel 91. Projecting laterally from the collar 54 is a stub shaft which rotatably supports a sleeve 92. Fixed on this sleeve 92 is an inner sprocket wheel 93 and an outer sprocket wheel 94. Traveling on the sprocket wheels 91 and 93 is a sprocket chain 95. Fixed on the shaft 85 in line with the sprocket wheel 94 is a sprocket wheel 96 and traveling on the sprocket wheel 94 and the sprocket wheel 96 is a sprocket chain 97. Fixed on the end of the shaft 85 remote from the sprocket wheel 96 is a sprocket wheel 98 which alines with a sprocket wheel 99 fixed on the shaft 87 and traveling on the sprocket wheels 98 and 99 is a sprocket chain 100. By this construction it will be obvious that upon actuating the motor 90 all of the worm wheels 58 will be rotated in the same direction.

The arm 64 of each lever 63 carries an engaging pin 101 which is adapted to engage the under side of the track 72 during a part of each rotation of the shaft 57. It will be apparent that when the pin 101 is in engagement with the track 72 the associated slip joint 62 will be held elevated. On the other hand when the pin 101 passes out of engagement with the track 72 the slip joint 62 will descend under the influence of gravity to its lowermost position and remain so disposed until the track 72 again moves into engagement with the pin 101.

Slidably mounted on the column 44 is a sleeve 102 provided at its lower end with oppositely disposed alined openings 103. Engaged on the threads 46 and extending through the openings 103 is an adjusting nut 104. It will be obvious that this nut 104 serves to support the sleeve 102 against downward movement on the column 44 under the influence of gravity and it will be further obvious that through the instrumentality of said nut the sleeve 102 and the parts supported by the sleeve to be hereinafter referred to can be readily adjusted to different elevations. Carried by and radiating from the sleeve 102 are arms 105 corresponding in number to the arms 55 and disposed in the same vertical plane as corresponding arms 55. Each of the arms 105 is provided at an intermediate point with a bearing 106 alined with the bearing 56 of the corresponding arm 55, said bearings 56 and 106 both serving to rotatably support the shaft 57 of the corresponding head of the apparatus. Mounted on the outer end of each arm 105 and disposed in longitudinal alinement with said arm is a forked member 107 including arms 108 and 109, the former arm being longer than the latter and between these arms the blow pipe 110 of the corresponding head of the apparatus is seated during the operation of said head. Fixed on each shaft 57 above the arm 105 is a segmental gear 111 which during the rotation of the shaft 57 passes across the inner ends of the arms 108 and 109 in position to operatively engage a pinion 112 fixed on the blow pipe 110 and effect the rotation of the blow pipe. The advance end of the gear 111 is provided with an upwardly extending lug 113 upon the upper end of which is pivoted for movement in a horizontal plane an arm 114. Pivotal movement of this arm 114 in the direction of rotation of the gear 111 is prevented by means of a downwardly directed finger 115 on the rear end of the arm 114 and held in abutting relation to the lug 113 by means of a spring 116. When the arm 114 is disposed in its normal position it lies in substantially radial relation to the shaft 57.

Pivotally mounted on the underside of the arm 108 is a latch 117 which is normally held in engagement with a stop pin 118 also carried by the arm 108 by means of a spring 119. The end of the latch 117 projecting between the arms 108 and 109 is provided with a cam edge 120 which is engaged by the blow pipe 110 during the insertion of the latter between the arms 108 and 109. This engagement of the blow pipe with the cam edge 120 will swing the latch 117 on its pivot so as to permit the full insertion of the blow pipe against a bearing 121 carried at the inner ends of the arms 108 and 109. As soon as the blow pipe has been inserted the proper distance between the arms 108 and 109 the spring 119 will operate to return the latch 117 to its normal position so as to lock the blow pipe 110 against accidental disengagement from its position between the arms 108 and 109. It will be noted however that the construction of the latch 117 is such that the manual disengagement of the blow pipe from between the arms 108 and 109 will not be interfered with. The position of the forked member or blow pipe holder 107 is such that when a blow pipe is associated therewith it will be disposed in longitudinal alinement with the slip joint 62 of the corresponding head of the apparatus so that when said slip joint is lowered it will receive the upper end of the blow pipe to connect the latter with the air supply. Fixed on the column 44 beneath the sleeve 102 is a collar 122 from which radiate arms 123 corresponding in number to the arms 105 and also being correspondingly disposed. Each of the arms 123 carries at its outer end a bearing 124 in which rotates the lower end of the shaft 57 of the corresponding head of the apparatus.

Mounted upon the table 47 is a plurality of parallel spaced pairs of ribs 125, corresponding to the number of heads of the apparatus and being positioned substantially in the planes of respective heads. The outer ends of the ribs 125 terminate in depending ears 126. Pivotally mounted between the ears 126 of each pair of ribs 125 is a lug 127 which depends from an intermediate point on a platform 128 whereby when said platform is disposed in horizontal position the inner portion thereof will be engaged upon the upper side of the table 47 and between the ribs 125. Depending from the outer end of each platform 128 are spaced transversely disposed ears 129 between which is journaled a roller 130 engaged upon the upper side of the track 41 and adapted to travel upon the latter continuously during the rotation of the apparatus as will hereinafter appear. Rising from each platform 128 adjacent the outer end thereof is a pin 131 and pivotally connected through the medium of this pin are sections 132 and 133 of a two-part mold. Mounted upon the inner end of each platform 128 is a cylinder 134 having slidably mounted therein a piston 135 including oppositely disposed leather cups 136 and 137. Secured to this piston 135 is a piston rod 138 which is slidably engaged through the forward end of the cylinder 134. The forward end of the cylinder 134 is provided with an air vent 139, while an air supply pipe 140 is engaged through the rear end of the cylinder for the purpose of delivering compressed air to the interior thereof. The forward end of the piston rod 138 exteriorly of the cylinder has mounted thereon a cross arm 141 and the terminals of this cross arm are connected to respective mold sections 132 and 133 by means of links D each of which comprises sections 142 and 143 connected together in a manner to permit relative longitudinal adjustment thereof. Through the medium of this adjustment of the links D it will be obvious that the sections 132 and 133 can always be maintained in correct relation for effecting the proper closing thereof. It will be noted that the weight of the mold at the outer end of the platform 128 is considerably in excess of the structure mounted on the inner end of said platform and for this reason it will be apparent that during the rotation of the apparatus the platforms and molds will move successively downwardly and transversely through the tank 42 and be subjected to the cooling influence of the liquid contained in said tank, said platforms being returned to horizontal position by reason of the engagement of the rollers 130 with the track 41. As the platforms 128 are returned to horizontal position the ribs 125 serve to guide and hold same in proper position to dispose the mold in correct vertical alinement with respect to the blow pipe irrespective of any wear that may arise in the pivotal connection between the platform and said ribs.

Mounted upon the upper end of the column 44 is a tubular member 144 having its bore reduced and threaded as at 145 and the portion of its bore disposed above the reduced portion 145 flared as at 146. Extending through the tubular member 144 adjacent its lower end is an air supply pipe 146'. This pipe is carried upwardly through the bore of said member and has one end thereof threaded in the reduced portion 145 of said bore. Rotatably mounted on the tubular member 144 is a sleeve 147 having a lower lateral flange 148 and an upper lateral flange 149. Threaded in the sleeve 147 is an eye member 150 through the instrumentality of which the sleeve is adapted to be connected with a suitable fixed part adjacent the apparatus whereby the sleeve is held against rotation on the tubular member 144 but permitting free rotation of said tubular member within the sleeve. Mounted in the flange 149 at diametrically opposite points respectively are bolts 151 and 152 and slidable upon these bolts is a joint member 153 having a central tapered portion 154 engaged in the flared portion 146 of the bore of the member 144 and also having a central passage 155. Slidable on the bolts 151 and 152 above the member 153 is a bridge plate 156 and extending through this bridge plate and having one end threaded in the passage 155 is a pipe 157 leading from a suitable compressed air supply (not shown). Encircling the bolts 151 and 152 respectively are springs 158 which bear at their upper ends against the bridge plate 156 and at their lower ends against the member 153 said springs serving to hold the tapered portion 154 of the member 153 in the flared portion 146 of the bore of the member 144. By this construction it will be apparent that the air supply through the pipe 146' will be constantly maintained during the rotation of the member 144 and during the rotation of the entire apparatus. Fixed on the tubular member 144 beneath the sleeve 147 is a collar of insulating material 159 and fixed upon this collar 159 are conducting rings 160, 161 and 162. Secured to and depending from the flange 148 is an arm 163 formed of insulating material. Mounted in this arm 163 are contact screws 164, 165 and 166 which engage respectively with the conducting rings 160, 161 and 162. Leading from the conducting rings 160, 161 and 162 are wires 167, 168 and 169 respectively. These wires are in turn connected with binding screws 170 respectively which are mounted on a block of insulating material 171 carried by the member 144 at the lower end of the latter. By this construction it will be apparent that suitable current can be supplied to the electrical devices moving with the apparatus without the necessity of the source of said current also moving with the apparatus.

Mounted on the column 44 beneath the collar 122 is a collar 172 from which radiate arms 173 corresponding in number and position to the arms 123. Each of the arms 173 carries at its outer end a forked member 174 which is disposed in vertical alinement with the corresponding forked member 107, said forked members 107 and 174 serving to hold the blow pipe 110 in proper alinement with the slip joint 62 and the mold of the corresponding head of the apparatus. Mounted upon each arm 173 at the inner end thereof is a three-way valve 175 which is operated through the medium of a handle 176. Each valve 175 is connected to the interior of the corresponding cylinder 134 by the pipe 140 and to the atmosphere by a passage 177. Each valve 175 is also connected to the air supply by means of a U-shaped distributing pipe 178, which latter pipe is connected to a vertically extending pipe 179, said pipe 179 uniting with the pipe 146' at 180. A valve 181 is included in the pipe 179 for controlling the flow of air therethrough. By this construction it will be apparent that when the valve 175 is in the position shown in Fig. 24 air will pass therethrough to the pipe 140 and be delivered into the cylinder 134 of the corresponding head with the result that the piston 135 will be driven to the forward end of the cylinder and the associated mold sections 132 and 133 moved to closed position. As soon as the valve 175 is operated to the position shown in Fig. 23 it will be apparent that the air at the rear of the piston 135 will be exhausted to the atmosphere and the mold sections 132 and 133 automatically moved to open position through the medium of springs 182 attached to respective mold sections at one end and at their other ends to arms 183 carried by the platform 128 of the corresponding head. This operation of the valves 175 for the purpose of opening and closing the molds is automatically accomplished during each blowing operation of the various heads of the apparatus in a manner and through the medium of a structure to be now referred to.

Depending from each arm 123 is a U-shaped member 184 and slidably engaged through the arm connecting portion of said U-shaped member and through a suitable passage in the arm 123 is a rod 185 the upper end of which is forked and has rotatably mounted thereon a roller 186. Adjustably mounted on the rod 185 within the U-shaped member 184 is a collar 187 and encircling the rod 185 is a spring 188 one end of which bears against the collar 187 and the other end against the arm connecting portion of the U-shaped member 184. This spring constantly tends to hold the rod 185 at the limit of its upward movement, such limit being determined by a collar 189 adjustably mounted on the rod 185 and adapted to engage the outer side of the arm connecting portion of the U-shaped member 184. The lower end of the rod 185 is connected to the free end of the handle 176 by means of a link 190. By this construction it will be apparent that when the rod 185 is moved downwardly a sufficient distance the valve 175 will be operated to admit air to the cylinder 134 of the corresponding head and thus operate the mold sections of said head to closed position. As soon as the rod 185 is released the spring 188 will operate to raise said rod and move the valve 175 to the position shown in Fig. 23 when the mold sections of the corresponding head will be moved to open position through the medium of the springs 182, such movement of the mold sections also serving to return the piston 135 to the rear end of the cylinder 134. The downward movement of each rod 185 is automatically accomplished during the operation of the head of the apparatus with which it is associated through the medium of an arcuate track 191 fixed upon the shaft 57 and having one end thereof terminating in a cam 192 adapted to engage the roller 186 during the initial rotation of the shaft 57 and thus force the rod 185 downwardly. The up and down movement of the rod 185 is also utilized to open and close a knife switch 193 mounted on one side of the U-shaped member 184. This knife switch 193 includes the usual pivoted arm 194 and fork 195 which receives the arm 194 to close the switch in the usual and well known manner. The free end of the arm 194 is connected to the lower end of the rod 185 by means of a link 196. By this construction it will be apparent that when the rod 185 is in its normal position the arm 194 will be disposed out of the fork 195 and the switch maintained open. On the other hand when the rod 185 is moved downwardly by the rotation of the track 191 it will be obvious that the arm 194 will be moved into the fork 195 and the switch closed. Each of the switches 193 is included in a circuit forming a component part of the mechanism for effecting the intermittent rotation of the apparatus so as to present the various heads of the machine to the operators successively.

In order to supply air through the pipes 61 to the various blow pipes of the machine, the pipe 179 is extended beyond its connection with the pipe 146' and then connected to a U-shaped distributing pipe 196' which is substantially concentric to the tubular member 144. The extremities of the pipe 196' are provided with T-joints 197 from which lead branch pipes 198 to respective pipes 61 of the various heads of the machine.

The mechanism for effecting the intermittent rotation of the apparatus embodies a vertical shaft 199 rotatably mounted in the frame A. Loosely mounted on this shaft 199 is a gear 200 and a ratchet wheel 201, said gear and ratchet wheel being connected through the medium of a common hub 202. Fixed upon the shaft 199 above the ratchet wheel 201 is a collar 203 provided with oppositely disposed radiating arms 204 each of which carries at its outer end a spring controlled pawl 205 adapted for coöperation with the ratchet wheel 201. Fixed on the shaft 199 above the collar 203 is a sprocket wheel 206 which is disposed in alinement with the sprocket wheel 53 mounted on the column 44. Traveling on the sprocket wheels 53 and 206 is a sprocket chain 207 through the instrumentality of which the rotation of the shaft 199 will be imparted to the column 44 and of course to the various heads of the apparatus supported by the column. Suitably mounted adjacent the shaft 199 is a cylinder 208 in which is slidably mounted a piston 209. Connected to this piston and slidably engaged through the forward end of the cylinder 208 is a piston rod 210 the end of which disposed exteriorly of the cylinder 208 terminates in a toothed rack 212 which operatively engages the gear 200. A pipe 213 communicates with the interior of the cylinder 208 at the rear end of the latter while a corresponding pipe 214 communicates with the front end of the cylinder at the forward end of the latter. The pipes 213 and 214 are mutually connected by a pipe 215 in which is included a valve 216 for controlling the supply and exhaust of air to and from opposite ends of the cylinder 208, said valve 216 being operatively connected with a pipe 217 leading from a suitable compressed air supply (not shown). The valve 216 is provided with a handle 218 which is pivotally connected at its free end with the core 219 of a solenoid 220. Mounted on one end of the solenoid 220 is a pocket or cap 221 in which is seated a spring 222 which constantly bears against the adjacent end of the core 219 to normally hold said core in the position shown in Fig. 20. Assuming the solenoid 220 to be energized the core 219 will occupy the position shown in Fig. 19. As the core 219 is connected with the handle 218 the valve 216 will be operated by the inward movement of the core 219 so as to admit air to the rear end of the cylinder 208 and exhaust air from the forward end of the cylinder to the atmosphere. This status will result in the piston 209 being driven forward which will cause the gear 200 and the ratchet wheel 201 to rotate to the left. During this rotation of the ratchet wheel 201 the pawls 205 will engage the teeth of said ratchet wheel and transmit the rotation of the latter to the shaft 199 and sprocket wheel 206 and the rotation of this sprocket wheel will in turn be transmitted by the sprocket chain 207 and sprocket wheel 53 to the column 44, thus rotating bodily the various heads of the apparatus. As soon as the solenoid 220 is deënergized the spring 222 will operate to move the core 219 to the position shown in Fig. 20. This movement of the core 219 will position the valve 216 to admit compressed air to the forward end of the cylinder 208 and exhaust air from the rear end of said cylinder to the atmosphere with the result that the piston 209 will be driven rearwardly and the gear 200 and ratchet wheel 201 rotated to the right. During this last named rotation of the ratchet wheel 201 the pawl 205 will ride over the teeth of said ratchet wheel and no rotation will be imparted to the shaft 199 or the sprocket wheel 206.

The wiring by which the circuit which energizes the solenoid 220 is conveyed can be best described by referring to Fig. 31 wherein the source of said circuit is indicated at 223 from the positive pole of which leads a wire 224. This wire 224 is connected to the contact screw 164, said screw engaging the conducting ring 160 as previously referred to. This conducting ring 160 is in turn connected by the wire 167 to the upper binding screw 170 in Fig. 15. From this binding screw 170 leads a wire 226 which is connected to the movable arm 194 of the switch 193 of each head of the apparatus. The fork elements 195 of the switches 193 are connected respectively to the contact plates 51 of the make and break device B by means of wires 227. Leading from the contact finger 52 is a wire 228 which is connected to the solenoid 220, said solenoid being also connected to the negative pole of the source 223 by means of a wire 229. The motor 90 is controlled by means of line, armature and shunt wiring operatively connected with a starting box or rheostat 230 in the usual and well known manner, the circuit for operating the motor 90 also emanating from the source 223.

In the operation of the apparatus the head thereof on the extreme right in Figs. 1 and 3 is ready to receive a blow pipe from the operator, while the head on the extreme left has completed the operation of blowing and is ready to have the blow pipe and ware carried thereby removed. The uppermost head of the apparatus in Fig. 3 is in operation, while the lowermost head in Fig. 3 is idle and the mold thereof is disposed within the tank 42 as shown in Fig. 7. In the head of the apparatus disposed at the extreme right in Figs. 1 and 3 the clutch mechanism is in the position shown in Figs. 26, 27 and 28, the blow pipe rotating gear in the position shown in Fig. 16 and the cam track of the mold opening and closing mechanism in the position shown in Fig. 21 as is likewise the remainder of said mechanism. In applying a blow pipe to the head of the apparatus on the extreme right of Figs. 1 and 3 the pipe is first moved into engagement with the long arms of the fork members 107 and 174 and then shoved along these arms toward the bearing 121. During this movement of the blow pipe same will engage the inner edge of the arm 114 and impart a partial rotation to the gear 111 and the shaft 57. As soon as the blow pipe is fully inserted in the forked members previously referred to the pinion 112 will mesh with the teeth of the gear 111 and the latch 117 will position itself to hold the blow pipe in place. The partial rotation of the gear 111 and the shaft 57 caused by the application of the blow pipe between the arms 108 and 109 will in turn effect a partial rotation of the segmental track 72 and the spokes supporting same which carry the clutch bolt C. As the lower end of the clutch bolt C is disposed in the notch 68 of the track 67 it will be obvious that said bolt as it is moved out of the notch 68 will rise upwardly and engage the crown gear 59 so as to connect the shaft 57 with said gear and cause the rotation of the latter to be imparted to said shaft. At the moment the clutch bolt C is engaged with the crown gear 59 the track 72 will pass out of engagement with the pin 101 and the slip joint 62 will descend upon the upper end of the blow pipe 110. Upon the institution of the rotation of the shaft 57 the cam portion 192 of the track 191 will engage the roller 86 and force the rod 185 downwardly to operate the valve 175 for the purpose of admitting air to the rear of the cylinder 134 and operate the piston 135 to close the mold sections 132 and 133.

The downward movement of the rod 185 just referred to will close the switch 193 and a circuit will be established through the wire 224, ring 160, wire 167, binding screw 170, wire 226, switch 193 of the operating head of the apparatus, wire 227 leading from said switch, contact plate 51, contact finger 52, wire 228, solenoid 220, wire 229 and thence back to the source 223. This circuit will energize the solenoid 220 and move the parts from the position shown in Fig. 20 to the position shown in Fig. 19 which will result in an outward stroke being imparted to the rack 212 and this stroke of said rack will rotate the column 44 and the heads of the machine until the next insulating projection 50 comes in contact with the contact finger 52 when the circuit will be broken, solenoid 220 deënergized and the parts returned to the position shown in Fig. 20. The momentum of the apparatus carries the insulating projection 50 slightly over the contact finger 52 thus leaving the parts properly set to effect the necessary rotation of the apparatus upon the operation of the succeeding head thereof. Before the shaft 57 shall have made one complete revolution the track 72 will again engage the pin 101 and elevate the slip joint 62 and at substantially the same time that the elevation of the slip joint takes place the gear 111 will pass out of engagement with the pinion 112 and the rotation of the blow pipe 110 will cease as will likewise the blowing operation. At the time of the disengagement of the gear 111 from the pinion 112 the roller 186 will pass out of engagement with the track 191 and the valve 175 will be operated to exhaust the air from the cylinder 134 and permit the mold sections to move to open position. The switch 193 will be opened simultaneously with the operation of the valve 175 just referred to. The rotation of the shaft 57 will then continue until the various parts have been properly positioned to institute the next operation of the head. When this status has been produced the notch 68 of the track 67 will aline with the clutch bolt C so that said bolt will move downwardly into the notch and become disengaged from the crown gear 59 thus terminating the rotation of the shaft 57.

It will be noted that the gears 111 are splined upon respective shafts 57 whereby said gears may be adjusted vertically on said shafts. In order to hold the gears 111 in a desired adjustment there is mounted in the hub of each gear a binding screw 231. By adjusting the collar 102, arm 105 and gear 111 vertically it will be obvious that the apparatus can be adapted with facility for use in connection with different sizes of molds, such adjustment positioning the lower ends of the blow pipes at a greater or less elevation.

It will be noted that when the shaft 57 has made one complete revolution if the blow pipe of the associated head is not removed from its holder the advance edge of the arm 114 will engage the blow pipe but as said arm is free to swing on its pivot in a direction opposite to the direction of rotation of the gear 111 it will partake of such pivotal movement and damage to parts obviated. As soon as the blow pipe is removed under these conditions the arm 114 will return to the position shown in Fig. 16.

Reverting to the clutch bolt C it will be obvious that in the event of the end of the pin 76 engaging the outer end of a tooth of the crown gear 59 when the clutch is thrown in the spring 79 will yield until the pin 76 is positioned between adjacent teeth of the crown gear when said pin will be forced between the teeth. In this way breakage of the pin 76 and interference with the throwing in of the clutch is avoided.

What is claimed is:—

1. In a glass blowing apparatus, the combination of a movable carrier, normally inactive means for moving the carrier, a plurality of glass blowing devices supported by the carrier, means for independently instituting the operation of said glass blowing devices, and means operated by the initial movement of a glass blowing device for rendering the carrier moving means active.

2. In a glass blowing apparatus, the combination of a rotatable carrier, normally inactive means for rotating the carrier, a plurality of glass blowing devices supported by the carrier, means for independently instituting the operation of said glass blowing devices, and means operated by the initial movement of a glass blowing device for rendering the carrier rotating means active.

3. In a glass blowing apparatus, the combination of a movable carrier, normally inactive means for moving the carrier, a plurality of glass blowing devices supported by the carrier, means for independently instituting the operation of said glass blowing devices, and means operated by the initial movement of a glass blowing device for rendering the carrier moving means active to effect a predetermined movement of the carrier.

4. In a glass blowing apparatus, the combination of a rotatable carrier, normally inactive means for rotating the carrier, a plurality of glass blowing devices supported by the carrier, means for independently instituting the operation of said glass blowing devices, and means operated by the initial movement of a glass blowing device for rendering the carrier rotating means active to effect a predetermined rotation of the carrier.

5. In a glass blowing apparatus, the combination of a movable carrier, normally inactive means for moving the carrier, a plurality of glass blowing devices supported by the carrier, each of which includes means for detachably supporting a blow pipe, actuating means for each device, means operated by the application of a blow pipe to the supporting means of one of said devices for connecting said device to its actuating means, and means operated by the initial movement of a device for rendering the carrier moving means active.

6. In a glass blowing apparatus, the combination of a movable carrier, normally inactive means for moving the carrier, a plurality of glass blowing devices supported by the carrier, each of which includes means for detachably supporting a blow pipe, actuating means for each device, means operated by the application of a blow pipe to its supporting means for connecting said device to its actuating means, and means operated by the initial movement of a device for rendering the carrier moving means active over a predetermined period.

7. In a glass blowing apparatus, the combination of a rotatable carrier, normally inactive means for rotating the carrier, a plurality of glass blowing devices supported by the carrier, each of which includes means for detachably supporting a blow pipe, actuating means for each device, means operated by the application of a blow pipe to its supporting means for connecting the glass blowing device to its actuating means, and means operated by the initial movement of a device for rendering active the carrier rotating means.

8. In a glass blowing apparatus, the combination of a movable carrier, normally inactive means for moving the carrier, a plurality of glass blowing devices supported by the carrier each of which includes a detachably supported blow pipe, and means operated by the application of a blow pipe to a device for rendering active the carrier rotating means.

9. In a glass blowing apparatus, the combination of a movable carrier, normally inactive means for moving the carrier, a plurality of glass blowing devices supported by the carrier each of which includes a detachably supported blow pipe, and means operated by the application of a blow pipe to a device for rendering active the carrier rotating means for a predetermined time.

10. In a glass blowing apparatus, the combination of a movable carrier, a plurality of glass blowing devices supported by the carrier each of which includes a detachably supported blow pipe, fluid pressure means for moving the carrier, and means operated by the application of a blow pipe to one of said devices for rendering said fluid pressure means active.

11. In a glass blowing apparatus, the combination of a rotatable carrier, a plurality of glass blowing devices supported by the carrier each of which includes a detachably supported blow pipe, fluid pressure means for rotating the carrier, and means operated by the application of a blow pipe to one of said devices for rendering said fluid pressure means active.

12. In a glass blowing apparatus, the combination of a movable carrier, a plurality of glass blowing devices supported by the carrier each of which includes a detachably supported blow pipe, and normally inactive electrically controlled means for moving the carrier, said means being rendered active by the application of a blow pipe to a related glass blowing device to move said carrier.

13. In a glass blowing apparatus, the combination of a movable carrier, a plurality of glass blowing devices supported by the carrier each of which includes a detachably supported blow pipe, normally inactive electrically controlled means for moving the carrier and rendered active by the application of a blow pipe to a related glass blowing device for moving said carrier, and means for automatically rendering the electrically controlled means inactive when the carrier has moved a predetermined distance.

14. In a glass blowing apparatus, the combination of a rotatable carrier, a plurality of glass blowing devices supported by the carrier each of which includes a detachably supported blow pipe, and normally inactive electrically controlled means for rotating the carrier and rendered active by the application of a blow pipe to a related glass blowing device.

15. In a glass blowing apparatus, the combination of a rotatable carrier, a plurality of glass blowing devices supported by the carrier each of which includes a detachably supported blow pipe, normally inactive electrically controlled means for rotating the carrier and rendered active by the application of a blow pipe to a device for rotating said carrier, and means for automatically rendering the electrically controlled means inactive when the carrier has rotated a predetermined distance.

16. In a glass blowing apparatus, the combination of a rotatable carrier, means for rotating said carrier, a plurality of glass blowing devices supported by the carrier each of which includes a mold formed of a pair of sections, means constantly tending to hold said sections in open position, means for independently instituting the operation of the glass blowing device, fluid pressure means for moving the sections of the mold to closed position and for holding same therein during the operation of blowing, and means operated by the initial movement of a glass blowing device for rendering the associated fluid pressure means active.

17. In a glass blowing apparatus, the combination of a rotatable carrier, means for rotating said carrier, a plurality of glass blowing devices supported by the carrier each of which includes a mold formed of a pair of sections and a blow pipe and support therefor, means constantly tending to hold said sections in open position, means for independently instituting the operation of the glass blowing devices, fluid pressure means for moving the sections of the mold to closed position and for holding same therein during the operation of blowing, and means operated by the application of a blow pipe to its support for rendering the associated fluid pressure means active.

18. In a glass blowing apparatus, the combination of a compressed air supply, a blow pipe and support therefor, a mold comprising a pair of sections, means constantly tending to hold the sections in open position, a cylinder, a piston slidable in the cylinder, connections between the piston and each of the mold sections whereby the movement of the piston in one direction will close the mold sections, means operated by the application of the blow pipe to its support for connecting the cylinder with the air supply to move the piston in a direction to close the mold sections, and means for exhausting the compressed air from the cylinder, at the termination of the operation of blowing to permit the sections of the mold to return to open position.

19. In a glass blowing apparatus, a blow pipe and support a mold comprising a pair of sections, means constantly tending to hold the sections of the mold in open position, fluid pressure operated means for moving the mold sections to closed position, a compressed air supply, connections between the air supply and the fluid pressure operated means, a valve in said connections for controlling the supply and exhaust of air to and from the fluid pressure operated means, means normally holding the valve in position to cut off the fluid pressure operated means from the air supply, and means operated by the application of the blow pipe to its support for moving said valve to position to connect the fluid pressure operated means and the air supply.

20. In a glass blowing apparatus, the combination of a rotatable carrier, fluid pressure operated means for rotating the carrier, electrically operated means for controlling the actuation of said fluid pressure means, an electric circuit for actuating said electrically operated means, a switch in said circuit, a glass blowing device mounted on said carrier and including a mold comprising a pair of sections, means constantly tending to hold said sections in open position, fluid pressure operated means for moving the mold sections to closed position, a compressed air supply, connections between the air supply and the second named fluid pressure operated means, a valve in said connections for controlling the supply and exhaust of air to and from the second named fluid pressure operated means, means normally holding the valve in position to cut off the fluid pressure operated means from the air supply and said switch in open position, and means operated by the initial movement of the glass blowing device for moving said valve to position to connect the second named fluid pressure operated means and the air supply and for moving said switch to closed position.

21. In a glass blowing apparatus, the combination of a rotatable carrier, normally inactive means for rotating the carrier, a plurality of glass blowing devices supported by the carrier each of which includes a detachably supported blow pipe, and means operated by the application of a blow pipe to a given device for rendering the rotating means active.

22. In a glass blowing apparatus, the combination of a rotatable carrier, normally inactive means for rotating the carrier a plurality of glass blowing devices supported by the carrier each of which includes a detachably supported blow pipe, and means operated by the application of a blow pipe to a given device for rendering the carrier rotating means active for a predetermined period.

23. In a glass blowing apparatus, the combination of a rotatable carrier, a glass blowing device mounted upon the carrier and including means for detachably supporting a blow pipe, a cylinder, a piston mounted for reciprocation in said cylinder, connections between the piston and the carrier whereby the movement of the former in one direction will rotate the carrier, a valve for controlling the admission and exhaust of compressed air to and from opposite ends of the cylinder, spring means normally holding said valve in position to admit compressed air to the cylinder to move the piston to its limit in a direction ineffective to rotate the carrier, an electric circuit, electrically operated means for altering the position of the valve to effect the movement of the piston in the opposite direction, means for closing said circuit upon the application of a blow pipe to its supporting means to actuate the electrically operated means, and means operated upon a predetermined rotation of the carrier to break the circuit.

24. In a glass blowing apparatus, the combination of a rotatable carrier, a plurality of glass blowing devices mounted upon the carrier each of which includes means for detachably supporting a blow pipe, a cylinder, a piston mounted for reciprocation in said cylinder, connections between the piston and carrier whereby the movement of the former in one direction will rotate the carrier, a valve for controlling the admission and exhaust of compressed air to and from opposite ends of the cylinder, spring means normally holding said valve in position to admit compressed air to the cylinder to move the piston to its limit in a direction ineffective to rotate the carrier, an electric circuit for each of the glass blowing devices, electrically operated means operatively connected with all of said circuits for altering the position of the valve to effect the movement of the piston in the opposite direction, means for closing one of said circuits upon the application of a blow pipe to a corresponding device to actuate the electrically operated means, and means operated upon a predetermined rotation of the carrier to break said circuit.

25. In a glass blowing apparatus, a blow pipe, a mold comprising a pair of sections, a compressed air supply, a continuously rotating element, a rotatably mounted shaft, means operated by the application of the blow pipe to the device for connecting said shaft to the rotating element, means constantly tending to hold the sections of the mold in open position, fluid pressure operated means for moving the mold sections to closed position, connections between the air supply and the fluid pressure operating means, a valve in said connections for controlling the supply and exhaust of air to and from the fluid pressure operated means, a plunger, connections between said plunger and the valve whereby the movement of the former in one direction will position the valve to connect the fluid pressure operated means with air supply, means constantly tending to hold the plunger in position to dispose the valve in position to cut off the fluid pressure operated means from the air supply and to exhaust the compressed air stored in the fluid pressure operating means to the atmosphere, and a cam device fixed on said shaft and adapted to engage and move the plunger to position the valve to connect the fluid pressure operated means and air supply.

26. In a glass blowing apparatus, the combination of a rotatable carrier, fluid pressure operated means for rotating the carrier, electrically operated means for controlling the actuation of said fluid pressure means, an electric circuit for actuating said electrically operated means, a switch in said circuit, a glass blowing device mounted on said carrier and including a blow pipe, a mold comprising a pair of sections, a continuously rotating element, a rotatably mounted shaft, means operated by the application of the blow pipe to the device for connecting said shaft to the rotating element, means constantly tending to hold the sections of the mold in open position, fluid pressure operated means for moving the mold sections to closed position, connections between the air supply and the second named fluid pressure operating means, a valve in said connections for controlling the supply and exhaust of air to and from the second named fluid pressure operating means, a plunger, connections between said plunger and the valve and between said plunger and switch whereby the movement of the plunger in one direction will position the valve to connect the second-named fluid pressure operated means with the air supply and simultaneously close said switch, means constantly tending to hold the plunger in position to dispose the valve in position to cut off the second-named fluid pressure operated means from the air supply and to open said switch, and a cam device fixed on said shaft and adapted to engage and move the plunger to position the valve to connect the second-named fluid pressure operated means and air supply and to close said switch.

In testimony whereof, I affix my signature, in the presence of two witnesses.

ALBERT C. WILCOX.

Witnesses:
HENRY T. BRIGHT,
FRANK S. APPLEMAN.